United States Patent Office 3,223,333
Patented Dec. 14, 1965

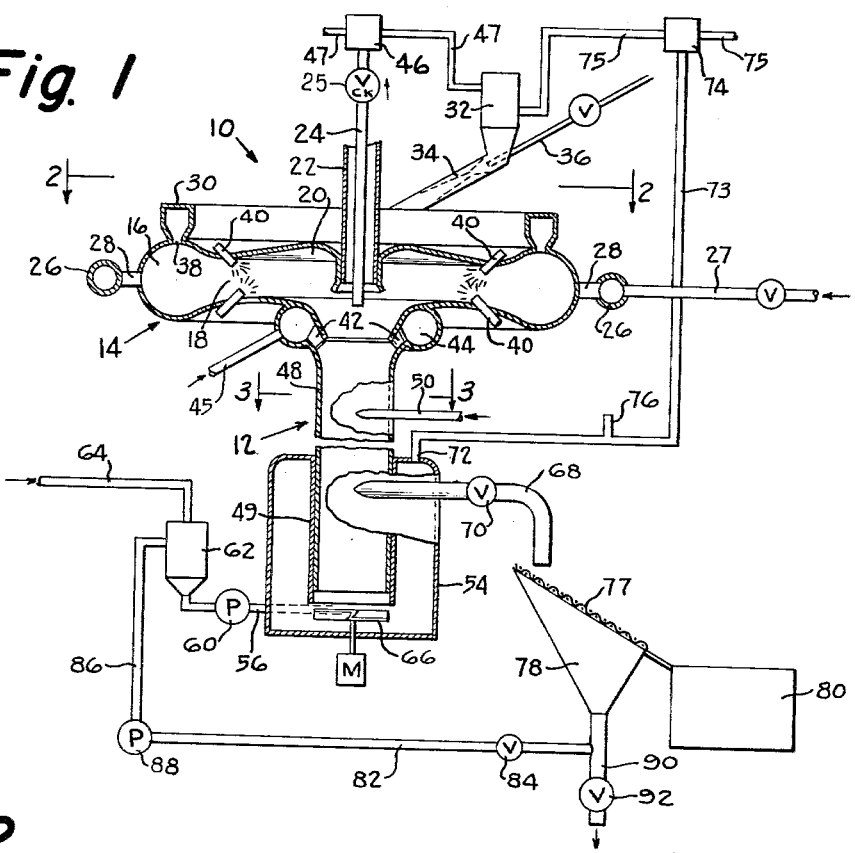
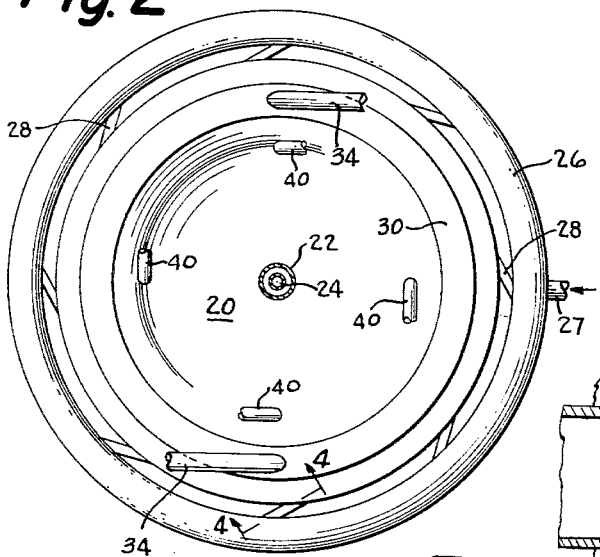
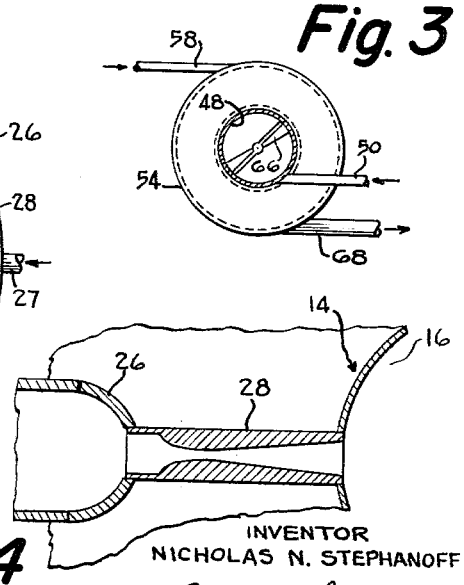

3,223,333
METHOD FOR PREPARING LIQUID SLURRIES AND FOR DISPERSEMENT THEREOF IN POLYMERIC SUBSTANCES
Nicholas N. Stephanoff, Haverford, Pa., assignor to Fluid Energy Processing and Equipment Company, Lansdale, Pa., a corporation of Pennsylvania
Filed Sept. 24, 1963, Ser. No. 311,025
13 Claims. (Cl. 241—5)

This invention relates to a method for preparing liquid suspensions of finely subdivided comminuted materials in polymeric substances. In a specific embodiment of the invention, it relates to the incorporation of very finely divided carbon black and functionally equivalent materials in natural and synthetic rubbers.

It has become standard practice in the rubber industry to incorporate very finely ground carbon black into rubber products, particularly those used in the production of vehicle tires and the like, in order to reinforce the rubber and to increase its modulus. Various methods have heretofore been used to incorporate the carbon black into the rubber, the most effective being the mixing of an aqueous suspension of the carbon black, in the form of a slurry, with the rubber, in the form of a latex, whereby intimate and uniform intermixture is obtained, after which the mixture is coagulated to form a solid rubber product having the carbon black uniformly dispersed therethrough in finely divided form.

One of the most troublesome problems which, however, immediately presented itself in the carbon black slurry process was the formation and retention of the carbon black slurry itself. Carbon black is hydrophobic and therefore difficult to mix with water. Furthermore, the more finely ground it is, the more difficult it is to wet with water. It was, therefore, found necessary to incorporate dispersing agents, such as detergents or surface active agents, in the slurry. However, the dispersing agents deleteriously affected the bond between the carbon black and the rubber, thereby greatly lowering the reinforcing action of the carbon black. In addition, the necessity for preparing the slurries in batches prior to use created various problems of storage such as contamination and settling out.

The above problems are largely overcome by the use of steam grinding whereby the carbon black raw material, in the form of pellets, is fed continuously into an elongated, doughnut-shaped casing where it is exposed to high velocity streams of steam. The solid carbon black particles are swept into violent turbulence by the high velocity streams, whereby the particles collide with and quickly pulverize one another. Thereafter, the gaseous suspension of comminuted carbon black in steam is quenched by water sprays. The quenched steam immediately thoroughly wets the finely ground carbon black particles and forms a homogeneous aqueous suspension or slurry of the carbon black without the need for any dispersing agents. The slurry is then mixed with rubber latex, after which the mixture is treated with a coagulating agent such as dilute sulfuric acid.

The above described process utilizing the steam grinding method is ordinarily subject to several disadvantages. For example, it is necessary to use separate units for grinding, quenching, mixing and coagulating with connecting pipes, valves, pumps, etc. This requires a relatively large plant area. Furthermore, in order to obtain maximum effectiveness and finest grinding, the steam should be superheated to as high a temperature as can be tolerated by the material being ground. This is because the velocity of the steam or other fluid leaving the nozzle varies directly as the square root of the absolute temperature of the fluid entering the nozzle, whereas the kinetic energy varies directly as the square of the velocity. Therefore, the greater the velocity of the fluid the greater the grinding energy and the finer the particle size.

It is also known that oxygen is chemisorbed on the surfaces of the carbon black particles in the form of carbon-oxygen complexes and that this surface oxygen has a retarding effect on the vulcanization of the reinforced rubber products. This oxygen is largely removed by high temperature heating whereby the hydrogen is evolved as molecular hydrogen and the oxygen as carbon monoxide and carbon dioxide.

However, where ordinary quenching towers, having ordinary low power water sprays, are used, it is not economically feasible to utilize extremely high steam temperatures because an excessively large amount of water must be used to effect sufficient cooling and this requires a larger cooling area in the form of tremendously large cooling towers.

An extremely effective operation of this process would be to utilize the quenching sprays for the double purpose of simultaneously (1) quenching or condensing the steam and (2) supplying the latex for admixture with the wetted carbon black. In that way the final mixture would contain a much greater proportion of latex solids relative to water. However this is not possible in the ordinary quenching tower because the temperature of the steam-ground carbon black is far above the boiling temperature of water (212° F.) and if the latex was mixed into the quenching sprays in anything except the most dilute proportions, the water would quickly evaporate and leave the latex to agglomerate in solid chunks not utilizable for coating of the carbon black particles. Furthermore, when processing some latexes or other types of polymeric substances which are adversely affected by high temperatures, it would be impossible to introduce such substances into the high temperature zone in even the most diluted form.

It is one object of the present invention to provide a method of preparing aqueous suspensions of carbon black and functionally similar materials whereby the utmost fineness of particle size is easily and quickly obtained.

Another object of the present invention is to provide a method of the aforesaid type wherein any surface oxygen on the particles is removed.

Another object of the present invention is to provide a method of forming reinforced polymeric substances in a one-operation process wherein grinding of the reinforcing particles, mixing of the particles with the polymeric substance in fluid condition and coagulation of the mixture automatically follow each other under the most effective conditions and in the proper proportions.

Another object of the present invention is to provide a method wherein all the steps of grinding of reinforcing particles, surface wetting of the particles, mixing of reinforcing particles with fluid polymer and coagulation of the mixture are automatically effected during a single operation.

Another object of the present invention is to provide a method of the aforesaid type wherein temperature and pressure conditions can be varied in accordance with the type of polymer being treated.

Another object of the present invention is to provide a method of the aforesaid type wherein the size of the coagulated particles can be easily varied as desired.

Other objects and many of the attendant advantages of this invention will be readily appreciated as the same becomes better understood by reference to the following description when read in conjunction with the accompanying drawings wherein:

FIG. 1 is an elevational view, partly diagrammatic, of an apparatus embodying the present invention.

FIG. 2 is a cross-sectional view taken on line 2—2 of FIG. 1.

FIG. 3 is a cross-sectional view taken on line 3—3 of FIG. 1.

FIG. 4 is a fragmentary sectional view taken on line 4—4 of FIG. 2.

Referring now in greater detail to the various figures of the drawing wherein similar reference characters refer to similar parts, there is shown a treating unit, generally designated 10, which comprises a tubular stack 12 in fluid connection at its upper end with a radially outwardly extending hollow head 14.

The head 14 is internally divided into an outer annular grinding chamber 16, an intermediate annular constriction or throat 18 and an annular inner quenching chamber 20. The quenching chamber 20 is provided with a central aperture through which extends a water inlet tube 22 connected at its exterior end (not shown) to a source of water. This water inlet 22 surrounds a coaxial vent tube 24 having a check valve 25. The outer wall of the tube 24 is spaced from the inner wall of the tube 22.

Encircling the outer periphery of the head 14 is an annular steam chest 26 connected to a source of steam through a valved conduit 27 and being in fluid connection with the outer or grinding chamber 16 through a plurality of nozzles 28 arranged in tangential manner relative to the periphery of the head 14. The nozzles 28 are preferably of the so-called convergent-divergent type specifically described in applicant's prior Patent No. 2,297,726, dated October 6, 1942. This convergent-divergent type of nozzle produces superacoustic velocities, that is velocities greater than the velocity of sound in the same fluid at the same pressure and temperature. The tangential arrangement of the nozzles is such that the path of the stream from one nozzle intersects the path of the stream from another, thereby providing increased opportunities for impingement of the particles in the streams against one another and consequently causes increased pulverization as the result of the collisions of the particles.

As stated above, the velocity increases with increase of the temperature and the kinetic energy increases as the square of the velocity. If to the temperature increase there is added a further nozzle velocity increase, the resultant kinetic energy is even more greatly increased and, as a result, the degree of pulverization due to collision of the particles is the more greatly increased. In this respect, experimentation has shown that using steam at a temperature of 440° F., the nozzle velocity of an ordinary abrupt type nozzle is about 1550 ft./sec. constituting acoustic velocity and giving a base kinetic energy factor of 100%. At 800° F., utilizing the abrupt nozzle, the velocity is about 1900 ft./sec. with a kinetic energy factor of about 150%, and at 1000° F. the velocity is about 2050 ft./sec. with a kinetic energy factor of about 175%. However, if a convergent-divergent nozzle is used with the steam at 800° F., there is a superacoustic velocity of about 3100 ft./sec. with a kinetic energy factor of about 400%, while at 1000° F. with such nozzle, the velocity is about 4500 ft./sec. with a kinetic energy factor of about 850%.

The tangential arrangement of the nozzles 28 coacts with a tangential feed of the carbon black or other material to be pulverized to produce a rotational motion of the steam and particle mixture in the grinding chamber 16. The carbon black or other particulate material is fed into an annular distributor header 30 by means of one or more injection feed hoppers 32 having venturi nozzles 34. These venturi nozzles are fed with actuating steam through inlets 36 connected to a source of steam (not shown). If desired, the steam actuated venturi feeders can be replaced by mechanical screw feeders or any other desirable type of feed means. The annular header 30, to which the venturi nozzles supply the material, is positioned above the grinding chamber 16 and communicates therewith by means of a plurality of tangential inlet nozzles 38.

The grinding or pulverization of the carbon black in the chamber 16 is effected by the violent jet action of the steam introduced through the nozzles 28, the solid particles being swept into violent turbulence by the sonic or supersonic velocity streams colliding with and quickly pulverizing one another. As the pulverized particles are whirled around in the vortex created by the high velocity steam, the finer particles are carried radially inwardly by the viscous drag of the steam toward the annular throat 18, while the heavier particles continue to whirl around and collide with each other in the chamber 16, where they are joined by additional raw feed from the nozzles 38 until they, in turn, have been pulverized into sufficiently fine particle size to be carried toward the throat 18.

At the annular throat 18, the rotational velocity increases because the diameter of the throat is less than the diameter of the chamber 16 and, consequently, the centrifugal force increases considerably. The relatively narrow throat also has a venturi effect to speed up the steam and entrained particles. This, in turn, creates a greater vortex which forms a barrier around the vortex in the chamber 16 against the inadvertent escape of the larger particles.

The fine particles mixed with the steam, which is injected through the nozzles 28 at a preferable temperature of about 1000° F., pass spirally through the throat 18 toward the chamber 20. Prior to entering the chamber 20, however, they are subjected to the action of jets of atomized water from nozzles 40 placed around the periphery of the throat 18 and connected to a source of water (not shown). This water is maintained at a temperature sufficient to cause a sudden drop in the temperature of the steam from about 1000° F. to about 225° F. Since the volume of a gas varies directly with its absolute temperature, the sudden change from an absolute temperature of about 1460° K. to an absolute temperature of about 685° K. results in a decrease in volume of over 50% by the time the steam and its entrained particles enter the inner or quenching chamber 20.

The pre-cooled steam and particle mixture, now shrunk to about half its former volume, spirally enters the chamber 20 which, although somewhat wider than the throat 18, has a total reduced flow area because of the smaller diameter of the chamber 20. In the chamber 20 the pre-cooled steam is suddenly hit by a strong flow of water from the inlet 22 and since the steam and entrained particles are still whirling in a high intensity vortex, the water stream will itself be caught up and whirled around, while the vortex forms a partial vacuum in the center which aids in sucking still more water down from the inlet 22. The water caught up in the vortex acts to lower the temperature of the steam to below the boiling point so that condensation begins to occur. An additional flow of water is produced on the outer perimeter of chamber 20 by a plurality of tangentially arranged inlets 42 leading from an annular chamber 44 which is fed with pressurized water by a conduit 45 connected to a source (not shown). The water from the inlets 42, which flows in the same rotational path as the vortex within chamber 20 due to the tangency of the inlets, forms a barrier on the outer periphery of the vortex so that any uncondensed steam is trapped between two walls of water, i.e. the water entering from inlet 22 and that entering from inlets 42. If desired, the tangency of the inlets 42 can be arranged so that the flow therefrom is opposed to the direction of rotation of the vortex in chamber 20 so that an even greater turbulence for producing an even greater mixing action can occur. However, it is preferred to arrange the inlets 42 so as to augment the vortex flow in order to build up the maximum amount of kinetic energy in the vortex.

Any uncondensable gases and vapors in chamber 20 are allowed to pass up through the vent tube 24 from where they pass into a manifold 46 connected to the various hoppers 32 by conduits 47. These gases and vapors serve to aid in the particle feed from these hoppers. The check valve 25 here acts to prevent reverse flow in the event excess vacuum conditions prevail in the conduit.

The vortex in the chamber 20 passes down through the stack 12 which, as shown, consists of telescoping sections 48 and 49, whereby an adjustment in the length of the stack may be made as desired. Any suitable standard means for holding the stack sections in adjusted positions, such as set-screws, cam and slot means, etc., may be used.

As the vortex passes down through the stack 12, a stream of liquid latex is introduced through the upper section 48 thereof by means of an inlet 50 flexibly connected to a source (not shown). The inlet 50 is tangential to the periphery of the section 48 of stack 12 and is preferably arranged so that the latex issuing therefrom moves in a direction opposed to that of the vortex, whereby increased turbulence and mixing occurs. However, if desired, the tangency of inlet 50 may be such that the flow therefrom augments the rotational flow of the vortex, thereby increasing its kinetic energy.

As the entire vortex reaches the bottom of the stack 12, it passes into the relatively wide mixing tank 54 where it collapses. The collapse of the vortex creates a large amount of turbulence. This completes the mixing between the particles, now dispersed in an aqueous suspension, and the liquid latex. At the same time, a coagulating agent is introduced into the mixing tank 54 through an inlet 56 connected to a metering pump 60. The coagulant may be any suitable standard material such as alum, acids such as sulfuric acid, hydrochloric acid, phosphoric acid and acetic acid, salts, etc. The pump 60 is, in turn, connected to a tank 62 which is, itself, connected to a source of concentrated acid or other coagulant through conduit 64. Since it requires time to effect coagulation, the tank 54 can be of quite large diameter and a stirrer 66 is optionally provided adjacent the open bottom of stack 12 to rotate in opposition to the vortex as it descends from the stack so that there is increased turbulence and contact between the suspension of particles and latex (called the masterbatch) and the coagulant.

The stack 12 is adjustable to a desired height to obtain a predetermined pressure build-up therein, the pressure within the stack depending on its height. For example, a 10 ft. high stack will effect 4.5 lbs. pressure (19 p.s.i.g.), the temperature of condensation at that pressure being 225° F. This pressure build-up helps to prevent any steam flashing if any steam is left uncondensed in the stack.

As the coagulum in the tank increases, the level rises to the point where it leaves the tank through an outlet 68 having a pressure regulator valve 70 therein. The valve 70 is actually a variable constriction to control the pressure of the liquid in the tank 54. This will, in turn, control the height of the liquid in the stack. The outlet 68 is preferably arranged reversely tangential relative to the flow of the coagulum in the tank so that the coagulum normally flows therethrough as soon as it reaches its level. A vent 72 is provided on top of the tank 54 to exhaust any uncondensable gases from the tank. These gases are then passed through a conduit 73 into a manifold 74 from which conduits 75 lead into the various hoppers 32 to aid the feed of the material therein. A vent 76 is provided in the conduit 73 to eliminate a portion of the uncondensable gases.

The coagulum flows through the outlet 68 onto an inclined dewatering screen 77 through which the coagulant serum passes into a vessel 78 while the masterbatch crumb (the latex covered carbon black particles) passes across the screen 77 into a wash tank 80. At least a portion of the serum, containing remains of the coagulant, is withdrawn from the vessel 78 through a conduit 82 having a metering valve 84 therein and passed into the tank 62 through a conduit 86 by a pump 88. Any excess serum is drained from the system through a conduit 90 having a valve 92. In the tank 62, the recycled serum is used to adjust the pH of the fresh coagulant. For example, if the fresh acid has a pH of 1.7, and a pH of 3 is desired, the serum is used to adjust it to the proper acid condition.

It should here be noted that the degree of turbulence in the tank 54 affects the size of the crumb. The greater the degree of turbulence, the smaller the size of the crumb particles.

The crumb is thoroughly washed with water in the wash tank 80 and is then passed through the conventional dewatering, drying and other treatments (not illustrated).

The above description has been primarily concerned with the use of carbon black particles as a reinforcement for rubber, particularly synthetic type rubber which can be readily interspersed, in the latex phase, with the carbon black. However, it has now been determined that particulate materials other than carbon black can serve as reinforcement agents for rubber, either by themselves or in admixture with carbon black, if they can be ground fine enough. Among such other materials are silica, talc, bituminous and anthracite coal, gilsonite, etc. It, indeed, now appears probable that the smallness of particle size rather than its composition is the primary factor which determines its value as a reinforcing agent. Under these circumstances, the present mechanism assumes increasing importance because it permits the attainment of particles of a degree of minuteness not heretofore possible. This is because the present mechanism is capable of producing the highest degrees of kinetic energy due to its ability to utilize high temperatures of about 1000° F. while yet reducing the amount of water needed for condensation purposes, as explained above. It has, for example, been found that at a ratio of 1 lb. of steam per lb. of carbon black, a 100% production of particles of a size smaller than 2 microns is obtained, and of these the majority are measurable in Angstrom units less than 1 micron in size.

Utilizing the above ability of the present mechanism, other materials than carbon black may be ground for use as reinforcement agents, or mixtures may be produced by using one hopper 32 for carbon black, another for talc, etc. In this manner, it is possible that the ground material will find utility not only as a reinforcing agent but may simultaneously serve as a coloring pigment, a chemical catalyst or various other possible functions.

It is also to be understood that in the present method, it is quite feasible to use a mixture of water and latex as the quenching or condensing agent, instead of only water, because the mixture would be introduced through inlet 22 into the center of inner chamber 20 where the temperature of the steam has already been pre-cooled almost down to the temperature of condensation. There would, therefore, be little danger of agglomeration of the latex because of evaporation of the water. In this manner the amount of latex in a given mixture can be greatly increased over that which has heretofore been possible.

On the other hand, the high temperatures utilized in the outer chamber 16 results not only in an increase in the velocity of the steam but also serves to remove the oxygen from the surfaces of the carbon black particles by converting it to carbon monoxide and carbon dioxide in the manner explained above.

It is further to be understood that the comminuted material produced by the present method is utilizable as filler means for substances other than natural or synthetic rubber. For example, the method may be used to produce coloring pigments, binding agents, reinforcement agents, anti-static agents, magnetic agents or various other types of agents for dispersion through thermoplastic or thermosetting synthetic resins as well as ceramics, glass, etc.

It is also possible to utilize a fluid, gaseous or liquid, other than water as the pre-cooling means prior to entrance of the vortex fluid and entrained particles into the condensing chamber 20.

Obviously many modifications and variations of the present invention are possible in the light of the above teachings. It is, therefore, to be understood that within the scope of the appended claims, the invention may be practiced otherwise than as specifically described.

The invention claimed is:

1. A method of preparing a liquid suspension of finely subdivided solid particles which comprises passing particles of solid material into a first area comprising a vortex of gaseous fluid at a temperature substantially higher than the temperature of condensation of said fluid whereby the particles of said solid material impact each other at velocities sufficient to cause pulverization thereof into fines and larger particles, passing the resulting fines and entraining fluid, while in a radially inwardly tending spiral circulation maintaining said vortex, through a pre-cooling area while maintaining the larger particles of pulverization in the first area subject to further pulverization, said fines and entraining fluid being pre-cooled to a temperature just above the temperature of condensation of said fluid, then passing said fines and entraining fluid, while in said inwardly tending spiral circulation, into a condensation area and contacting them with a liquid at a temperature sufficient to condense said entraining fluid.

2. A liquid suspension prepared by the method of claim 1.

3. The method of claim 1 wherein said fluid is steam at an initial temperature of between about 400°–1000° F.

4. A liquid suspension prepared by the method of claim 3.

5. The method of claim 1 wherein said solid material comprises particles of varying compositions of matter, each composition of matter being passed separately into the vortex in the first area.

6. A liquid suspension prepared by the method of claim 5.

7. The method of claim 1 wherein said fines and entraining fluid are pre-cooled after passing through a constricted area to increase their velocity and kinetic energy.

8. The method of claim 1 wherein the liquid used to condense the entraining fluid in the condensation area is water.

9. The method of claim 1 wherein the liquid used to condense the entraining fluid in the condensation area is a mixture of water and rubber latex.

10. The method of claim 1 wherein the gaseous fluid is passed into said first area at superacoustic velocities.

11. A method of preparing a dispersion of solid particles in polymeric substances which comprises passing particles of solid material into a first area containing a vortex of gaseous fluid at a temperature substantially higher than the temperature of condensation of said fluid to effect impaction of the particles of said solid material against each other at velocities sufficient to cause pulverization thereof into fines and larger particles, passing the resulting fines and entraining fluid, while in a radially inwardly tending spiral circulation maintaining said vortex, through a pre-cooling area while maintaining the larger particles of pulverization in the first area subject to further pulverization, said fines and entraining fluid being pre-cooled to a temperature just above the temperature of condensation of said fluid, passing said fines and entraining fluid, while in said inwardly tending spiral circulation, into a condensation area where they are contacted with a liquid at a temperature sufficient to condense said entraining fluid, maintaining the resultant liquid dispersion of solid particles in a vortex while injecting a liquid phase of a polymeric substance into the vortex to obtain thorough intermixture thereof, and then coagulating the mixture.

12. The method of claim 11 wherein the polymeric substance is rubber latex.

13. The method of claim 11 wherein the solid material is at least partially carbon black and the polymerizable substance is rubber latex.

References Cited by the Examiner

UNITED STATES PATENTS

| | | | |
|---|---|---|---|
| 2,032,827 | 3/1936 | Andrews | 241—39 X |
| 2,460,546 | 2/1949 | Stephanoff | 260—95 |
| 2,636,688 | 4/1953 | Singh | 241—1 |
| 2,983,453 | 5/1961 | Bourguet et al. | 241—1 |
| 2,999,649 | 9/1961 | Radcliffe | 241—39 |
| 3,005,594 | 10/1961 | Vogel et al. | 241—39 |
| 3,058,673 | 10/1962 | Firing | 241—39 |

ROBERT C. RIORDAN, *Primary Examiner.*

J. SPENCER OVERHOLSER, *Examiner.*